US00RE46068E

(19) United States
(12) Reissued Patent
Belliveau

(10) Patent Number: US RE46,068 E
(45) Date of Reissued Patent: Jul. 12, 2016

(54) METHOD, APPARATUS, AND SYSTEM FOR IMAGE PROJECTION LIGHTING

(71) Applicant: Richard S. Belliveau, Austin, TX (US)

(72) Inventor: Richard S. Belliveau, Austin, TX (US)

(21) Appl. No.: 13/792,369

(22) Filed: Mar. 11, 2013

Related U.S. Patent Documents

Reissue of:
(64) Patent No.: 6,605,907
Issued: Aug. 12, 2003
Appl. No.: 10/090,926
Filed: Mar. 4, 2002

U.S. Applications:
(60) Division of application No. 13/292,162, filed on Nov. 9, 2011, now Pat. No. Re. 44,114, which is a division of application No. 11/199,548, filed on Aug. 8, 2005, now Pat. No. Re. 43,234, which is an application for the reissue of Pat. No. 6,605,907, which is a continuation-in-part of application No. 10/002,708, filed on Nov. 1, 2001, now Pat. No. 6,459,217, which is a division of application No. 09/394,300, filed on Sep. 10, 1999, now Pat. No. 6,331,756.

(51) Int. Cl.
*F21S 8/00* (2006.01)
*H05B 37/02* (2006.01)
*F21W 131/406* (2006.01)

(52) U.S. Cl.
CPC ..... *H05B 37/0254* (2013.01); *H05B 37/029* (2013.01); *F21W 2131/406* (2013.01)

(58) Field of Classification Search
CPC ..... H05B 37/029; H05B 37/0254; F21W 2131/406
USPC ..... 315/294, 315, 316; 362/133
See application file for complete search history.

(56) References Cited

U.S. PATENT DOCUMENTS

| | | | | |
|---|---|---|---|---|
| 3,706,914 | A | 12/1972 | Van Buren | 315/316 |
| 3,898,643 | A | 8/1975 | Ettlinger | 700/84 |
| 4,095,139 | A | 6/1978 | Symonds et al. | 315/153 |
| 4,697,227 | A | 9/1987 | Callahan | 362/233 |

(Continued)

OTHER PUBLICATIONS

Toshiba Lighting & Technology Corporation. Active Vision IV, 2 pages, copyright 1998-2004, (Retrieved from the Internet < URL: http:www.tlt/art/english/newpro/av4.htm on Jul. 14, 2006).

(Continued)

*Primary Examiner* — Anjan Deb
(74) *Attorney, Agent, or Firm* — Walter J. Tencza, Jr.

(57) ABSTRACT

A central controller and a number of image projection lighting devices ("IPLD"), a type of multiparameter light, are interconnected by an enhanced performance communications path that is capable of simultaneously carrying different digital signals on various bidirectional channels, such as various content signals, including continuous video and/or audio, in digital form on respective content transfer channels, a command signal on a control channel, and a control or content signal in digital form on an auxiliary channel. In accordance with commands transmitted from the central controller over the control channel, content signals may be sent from any of the IPLDs to any other of the IPLDs, or from the central controller to any of the IPLDs, or from any of the IPLDs to the central controller. The IPLDs have respective unique device addresses, and the control channel, the auxiliary channel, and the content transfer channels also have respective unique channel addresses.

9 Claims, 4 Drawing Sheets

(56) References Cited

U.S. PATENT DOCUMENTS

| | | | | |
|---|---|---|---|---|
| 4,980,806 | A | 12/1990 | Taylor et al. | 362/85 |
| 5,085,495 | A | 2/1992 | Iwahara | 359/455 |
| 5,113,332 | A | 5/1992 | Richardson | 362/282 |
| 5,769,527 | A * | 6/1998 | Taylor et al. | 362/85 |
| 5,828,485 | A | 10/1998 | Hewlett | 359/291 |
| 5,829,868 | A | 11/1998 | Hutton | 362/276 |
| 5,988,817 | A * | 11/1999 | Mizushima et al. | 353/94 |
| 6,057,958 | A | 5/2000 | Hunt | 359/291 |
| 6,099,128 | A | 8/2000 | Jessl | 353/51 |
| 6,147,812 | A * | 11/2000 | Narimatsu et al. | 359/691 |
| 6,208,087 | B1 | 3/2001 | Hughes | 315/291 |
| 6,219,093 | B1 | 4/2001 | Perry | 348/135 |
| 6,249,091 | B1 | 6/2001 | Belliveau | 315/312 |
| 6,331,756 | B1 | 12/2001 | Belliveau | 315/316 |
| 6,412,972 | B1 | 7/2002 | Pujol | 362/272 |
| 6,459,217 | B1 | 10/2002 | Belliveau | 315/315 |
| 6,588,944 | B2 | 7/2003 | Harris | 493/205 |
| 6,625,334 | B1 * | 9/2003 | Shiota et al. | 382/305 |
| 6,671,005 | B1 | 12/2003 | Pujol | 348/771 |
| 6,765,544 | B1 | 7/2004 | Willson | 345/6 |
| 7,042,172 | B2 * | 5/2006 | Dowling et al. | 315/294 |
| 7,178,941 | B2 * | 2/2007 | Roberge et al. | 362/225 |
| RE44,114 | E * | 4/2013 | Belliveau | 315/294 |

OTHER PUBLICATIONS

Toshiba Lighting & Technology Corporation. World Lighting Fair in Tokyo, 3 pages, copyright 1998-2004, (Retrieved from the internet <URL: http://www.tlt.co.jp/tlt/art/english/exhbi/wlf2002.htm on Jul. 14, 2006.

Toshiba Lighting & Technology Corporation, Topics, 3 pages, coyright 1998-2004, (Retrieved from the internet URL: <http://www.tlt.co.jp/tlt/art/english/topics/topi02.htm on Jul. 14, 2006).

Carlson, Steven B., A Guided Tour of DMX512, ROXCO/ Entertainment Technology, Mar. 25, 1996.

High End Systems, Inc., High End Systems Product Line, 2001.

Clay Paky Light Dimension, Golden Scan: The absolute winner, in Light Dimensions, Dec. 1988.

Electronic Theatre Controls, Inc., Sensor CEM Dimming System User Manual, Version 2.14, 1996.

Electronic Theatre Controls, Inc., Sensor CEM Dimming System User Manual, Version 3.0, 1998.

* cited by examiner

METHOD, APPARATUS, AND SYSTEM FOR IMAGE PROJECTION LIGHTING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This patent document] *The present application is a divisional reissue patent application which claims the priority of divisional reissue patent application Ser. No. 13/292,162, and parent reissue patent application Ser. No. 11/199,548, filed on Aug. 8, 2005, which is a reissue patent application of U.S. Pat. No. 6,605,907 which* is a continuation-in-part of and claims the benefit of U.S. patent application Ser. No. 10/002,708, filed Nov. 1, 2001, now U.S. Pat. No. 6,459,217, which is a division of U.S. patent application Ser. No. 09/394,300, filed Sep. 10, 1999 (now U.S. Pat. No. 6,331,756, issued Dec. 18, 2001), all of which hereby are fully incorporated herein in their entirety by reference thereto *and all of which are claimed for priority benefit by this present application; and in addition, this present application also claims the priority of divisional reissue application, Ser. No. 12/852,799 filed on Aug. 9, 2010, which also claimed the priority of parent reissue application Ser. No. 11/199,548.*

BACKGROUND OF THE INVENTION

1. Field of the Invention

The present invention relates to lighting systems that are digitally controlled and to the light fixtures used therein, and more particularly to such lighting systems as well as to multiparameter lights that have an image projection lighting parameter and a camera and that are useful in such lighting systems.

2. Description of the Related Art

Lighting systems are formed typically by interconnecting many light fixtures by a communications system and providing for operator control from a central controller. Such lighting systems may contain multiparameter light fixtures, which illustratively are light fixtures having individually remotely adjustable parameters such as beam size, color, shape, angle, and other light characteristics. Multiparameter light fixtures are widely used in lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multiparameter light devices are described in the product brochure entitled "The High End Systems Product Line 2001" and are available from High End Systems, Inc. of Austin, Tex.

Prior to the advent of relatively small commercial digital computers, remote control of light fixtures from a central controller was done with either a high voltage or low voltage current; see, e.g., U.S. Pat. No. 3,706,914, issued Dec. 19, 1972 to Van Buren, and U.S. Pat. No. 3,898,643, issued Aug. 5, 1975 to Ettlinger. With the widespread use of computers, digital serial communications over wire was widely adopted as a way to achieve remote control; see, e.g., U.S. Pat. No. 4,095,139, issued Jun. 13, 1978 to Symonds et al., and U.S. Pat. No. 4,697,227, issued Sep. 29, 1987 to Callahan. In 1986, the United States Institute of Theatre Technology ("USITT") developed a digital communications system protocol for multi-parameter light fixtures known as DMX512. Basically, the DMX512 protocol consists of a stream of data which is communicated one-way from the control device to the light fixture using an Electronics Industry Association ("EIA") standard for multipoint communications know as RS-485.

A variety of different types of multiparameter light fixtures are available. One type of advanced multiparameter light fixture which is referred to herein as an image projection lighting device ("IPLD") uses a light valve to project images onto a stage or other projection surface. A light valve, which is also known as an image gate, is a device such as a digital micro-mirror ("DMD") or a liquid crystal display ("LCD") that forms the image that is projected. U.S. Pat. No. 6,057,958, issued May 2, 2000 to Hunt, discloses a pixel based gobo record control format for storing gobo images in the memory of a light fixture. The gobo images can be recalled and modified from commands sent by the control console. U.S. Pat. No. 5,829,868, issued Nov. 3, 1998 to Hutton, discloses storing video frames as cues locally in a lamp, and supplying them as directed to the image gate to produce animated and real-time imaging. A single frame can also be manipulated through processing to produce multiple variations. Alternatively, a video communication link can be employed to supply continuous video from a remote source.

U.S. Pat. No. 5,828,485, issued Oct. 27, 1998 to Hewlett, discloses the use of a camera with a DMD equipped light fixture for the purpose of following the shape of the performer and illuminating the performer using a shape that adaptively follows the performer's image. The camera taking the image preferably is located at the lamp illuminating the scene in order to avoid parallax. The image can be manually investigated at each lamp or downloaded to some central processor for this purpose. This results in a shadowless follow spot.

BRIEF SUMMARY OF THE INVENTION

While the type of light fixture that provides a shadowless follow spot function and while the type of light fixture that stores images internally for projection have value in the lighting industry, these types of light fixtures and/or the lighting systems in which they operate all limit the operator of the lighting system to carrying out image projection operations on the basis of individual light fixtures. Moreover, having to store images at the light fixture is very limiting to the user of the device, since the operator must upload images to the light fixture from a computer before placing the light fixture into service.

These and other disadvantages of the prior art are overcome in one or more embodiments of the present invention by supporting two or more channels of content in digital form, including content such as image content, over one communications path for projection by multiple IPLDs in a lighting system, or by supporting a command channel and at least one channel of content in digital form, including content such as image content, over one communications path for projection by at least one IPLD in a lighting system. The term "image" is a general term that refers to a wide variety of image types, including continuous video images such as movies, graphic effects, and news programs, and still images such as pictures and clip art. In this way, one or more IPLDs on the same communications system may be supplied with one or more different channels of image content while at the same time being able to respond to commands, thereby giving the operator of the lighting system enormous creative control with regard to the image content projected by the various IPLDs in the system. The term "content" is a general term that refers to various types of creative works, including image-type works and audio works.

One embodiment of the present invention is a lighting system comprising a central controller, a digital communications path, and a plurality of image projection lighting devices. The digital communications path comprises a plurality of content transfer channels having respective unique content transfer channel addresses and being individually selectable in accordance with the content transfer channel addresses thereof. The plurality of image projection lighting devices have respective unique device addresses and are interconnected by the digital communications path for communicating content on a selected one or more of the content transfer channels in response to commands from the central controller.

Another embodiment of the present invention is a lighting system comprising a first digital communications path compliant with a DMX protocol; a second digital communications path having a bandwidth sufficient for transferring content in digital form; a plurality of light fixtures interconnected by the first digital communications path, the light fixtures including a plurality of image projection lighting devices having respective unique device addresses and being interconnected by both the first and second digital communications paths; and a DMX controller interconnected with the light fixtures by the first digital communications path. The second digital communications path is a bidirectional path comprising a plurality of addressable content transfer channels individually selectable by the DMX controller in accordance with the addresses thereof.

Another embodiment of the present invention is a multiparameter light comprising an internal control system, a light valve, an image control interface coupling the light valve to the internal control system, and a communications port coupled to the internal control system. The internal control system comprises a component for recognizing a unique device address received at the communications port on a control channel, and a component for selectively accessing a plurality of content transfer channels having respective unique content transfer channel addresses to communicate content in digital form thereon in response to receipt of the unique device address and at least one of the content transfer channel addresses at the communications port on the control channel.

Another embodiment of the present invention is a method of controlling a lighting system comprising a digital communications path with a bandwidth sufficient for communicating a plurality of content signals in digital form on respective transfer channels having respective unique channel addresses, and a plurality of image projection lighting devices interconnected by the digital communications path and having respective unique device addresses. The method comprises selecting a first one of the image projection lighting devices by the unique device address thereof; accessing with the first image projection lighting device a first one of the transfer channels of the digital communications path by the unique channel address thereof; carrying a first content signal over the digital communications path on the first transfer channel during at least part of the first image projection lighting device accessing step; selecting a second one of the image projection lighting devices by the unique device address thereof; accessing with the second image projection lighting device a second one of the transfer channels of the digital communications path by the unique channel address thereof; and carrying a second content signal over the digital communications path on the second transfer channel during at least part of the second image projection lighting device accessing step.

A further embodiment of the present invention is a lighting system comprising a central controller; an image projection lighting device comprising a housing, a light valve contained within the housing, and at least one communications connector mounted to the housing; and a digital communications path comprising a plurality of content transfer channels having respective unique content transfer channel addresses, the digital communications path being coupled to the central controller and further being coupled to the image projection lighting device via the communications connector.

Another embodiment of the present invention is a lighting system comprising a central controller; an image projection lighting device comprising a housing, a light valve contained within the housing, an external video input mounted to the housing, an external audio input mounted to the housing, and at least one communications connector mounted to the housing; and a digital communications path comprising a plurality of content transfer channels having respective unique content transfer channel addresses, the digital communications path being coupled to the central controller and further being coupled to the image projection lighting device via the communications connector.

DETAILED DESCRIPTION OF THE INVENTION, INCLUDING THE BEST MODE

Figure 1:
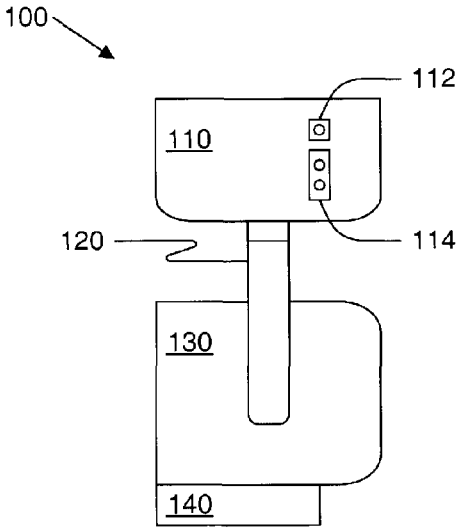
FIG. 1 is a [frontal] *side* plan view of a multiparameter light of the IPLD type *showing multiple communications system I/O ports*.
Figure 2:
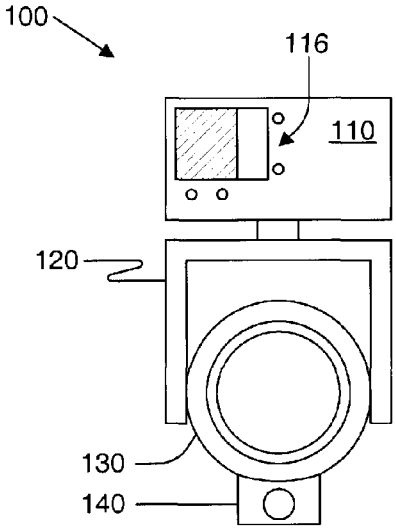
FIG. 2 is a [side] *frontal* plan view of the multiparameter light of FIG. 1 [showing multiple communications system I/O ports in accordance with the present invention].

FIGS. 1 and 2 show an example of an image projection lighting device ("IPLD") type of multiparameter light fixture that is capable of serving as a node on either one or both of two communications paths of a communications system. One of the communications paths is a digital communications path that is capable of simultaneously carrying command signals as well as two or more channels of content in digital form, including image content for projection by multiple IPLDs. FIG. 1 shows a [frontal] *side* view of a camera-equipped multiparameter light fixture 100, and FIG. 2 shows a [side] *frontal* view of the camera-equipped multiparameter light fixture of FIG. 1. In FIGS. 1 and 2, a camera 140 is attached to lamp housing 130. The camera 140 may be any desired type of camera, including cameras sensitive to visible wavelengths as well as cameras sensitive to infrared wavelengths. The lamp housing 130 is rotatably attached to a yoke 120 to enable a tilt movement of the lamp housing 130 and the camera 140. The yoke 120 is in turn rotatably attached to a base housing 110 to enable a pan movement of the lamp housing 130 and the camera 140. The base housing 110 contains a power supply and communications and control electronic circuits (not shown). A control panel 116 (FIG. 2) on the base housing 110 contains a display and various buttons for manually setting a unique device address and controlling various other operations of the multiparameter light fixture 100. The base housing 110 also includes two communications connectors 112 and 114 (FIG. 1) that are part of respective digital communications ports contained in the light fixture 100. It will be appreciated that more than two communications ports may be used if desired, and the multiple ports may include one or more analogue ports if desired. The digital communications connector 114 illustratively is part of a conventional DMX512 port that has a digital line-in terminal passing through to a digital line-out terminal, and is suitable for connection to a DMX communications path in the communications system. The digital communications connector 112 illustratively is part of a moderate to high bandwidth bidirectional digital port, and is suitable for connection to a moderate to high bandwidth bi-directional digital communications path such as an Ethernet network. The multiparameter light fixture 100 also has a power connector (not shown), which is omitted for clarity.

Although the IPLD shown in FIG. 1 has two different types of communications ports and a yoke for pan and tilt, IPLDs generally may have only one communications port or may have two or more communications ports, and may have only a couple of parameters or may have many parameters. For example, one type of IPLD has the parameters of color, shutter, image, dimming, lamp enable, zoom and focus, but not the parameters of pan and tilt (may not have a yoke mount).

The DMX port is provided in the IPLDs of FIGS. 1 and 2 for compatibility with existing installations and to provide a somewhat redundant control path, if desired. The DMX port may be eliminated entirely, or a different type of port may be provided as desired for redundancy or other purposes.

Other types of multiparameter light fixtures such as, for example, the unitary housing type that uses mirrors to direct the projected light (not shown), may also be equipped for image projection lighting and may also be provided with a camera.

While the camera 140 may be integrated with the lamp housing 130 in any desired manner, and may be independently positionable if desired, preferably the camera 140 is rigidly and securely attached to the lamp housing 130. The camera 140 thereby receives an image from wherever the lamp housing 130 is directed at by the pan and tilt mechanism of the multiparameter light 100. In this way, the light projected by the multiparrameter light and the camera essentially point in the same direction. Images received by the camera 140 are sent to the control electronics located within the base housing 110 of the multiparameter light fixture 100.

Having a camera mounted on a multiparameter light fixture is advantageous in may ways. For example, frequently large television shows such as award shows and the like use many multiparameter lights on the stage set. A broadcasting company may also use several cameras to create several camera angles that provide different looks at the stage, for broadcast purposes. IPLD type of light fixtures also may be mounted at many locations on the stage set. Some will often be mounted on the stage itself behind the performer. Some lights of the invention will be mounted overhead of the performer while still others are mounted to stage right or left. A camera as a component of a IPLD can produce at or almost broadcast quality pictures from aspects of the stage where the broadcast companies television cameras are not located and do not have the ability to image that particular location or direction. The video camera may be a block camera type such as those available from Sony Broadcast and Professional of One Sony Drive Park Ridge, N.J. The communications port 112 is connected to a digital communications path (FIG. 3) in the communication system to enable the transfer of images to other IPLDs in the lighting system or to a central controller, as well as the receipt of images from the other IPLDs in the lighting system or from a central controller. The operator of the lighting system may address individual IPLDs from the central controller 380 and choose which of many content transfer channels is to be acted upon or projected by the selected IPLDs.

The multiparameter light 100 is suitable for use in a communications system with other multiparameter lights, which may or may not be IPLD type, as well as with other types of light fixtures that may or may not have integrated cameras. The communications system may be single path or multiple path. A suitable multiple path communications system is described in my U.S. Pat. No. 6,331,756 entitled "Method and Apparatus for Digital Communications with Multiparameter Light Fixtures," which issued Dec. 18, 2001 and hereby is incorporated herein by reference in its entirety.

Figure 3:
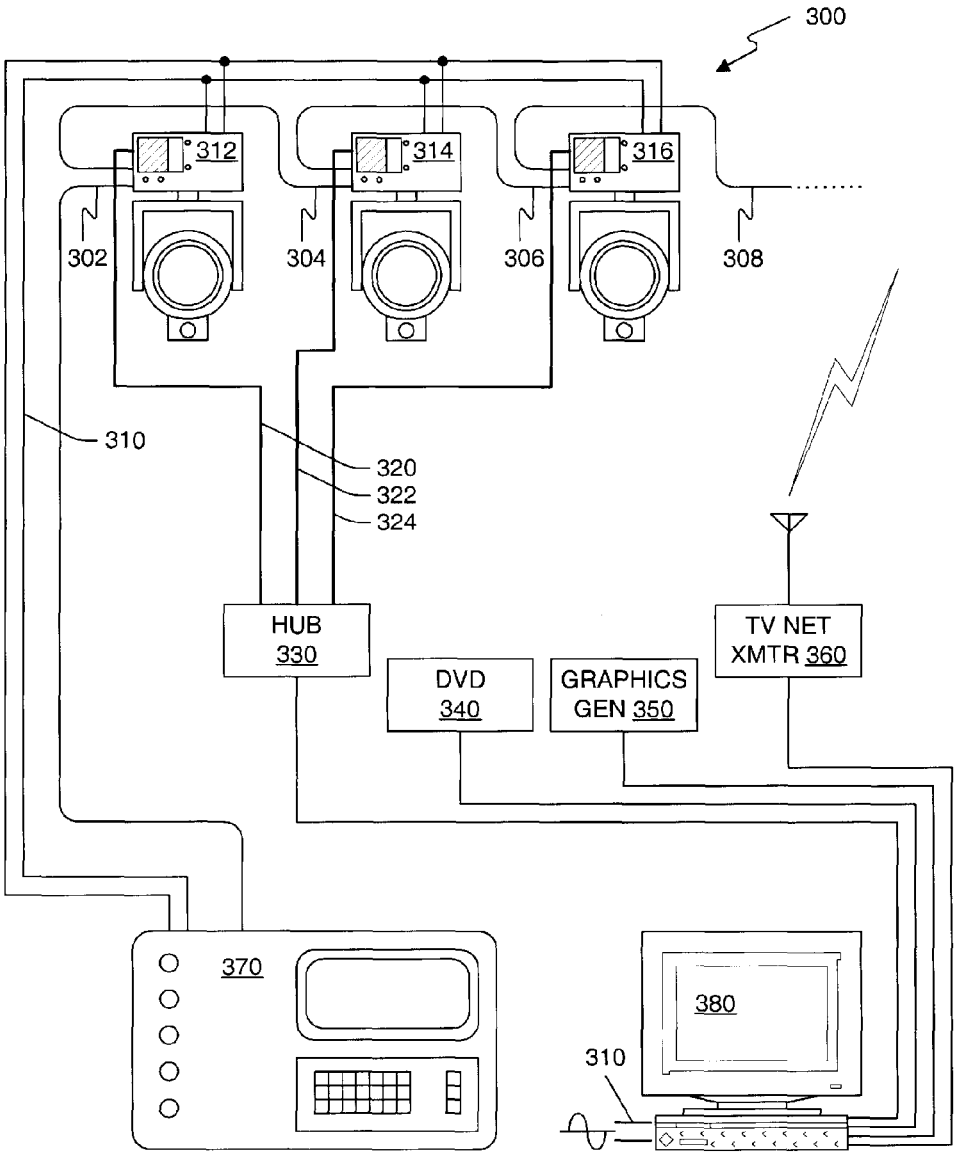
FIG. 3 is a schematic drawing of a lighting system.

FIG. 3 shows an illustrative multiple path lighting system 300. Central controller 370 (illustratively a DMX controller of a type well known in the art, although controllers based on other protocols may be used if desired), central controller 380 (illustratively a computer system or two or more computer systems linked together), and light fixtures 312, 314 and 316 are powered from the power mains over standard building electrical wiring 310. A DMX communications cable 302 is run from the DMX controller 370 to an IPLD 312, which illustratively is an IPLD type multiparameter light fixture such as the light fixture 100, but which may be any other type of IPLD. Additional communication cable segments 304 and 306 respectively run to IPLDs 314 and 316. While only three IPLDs are shown in FIG. 3 for clarity, typically lighting systems may have thirty or more light fixtures, including light fixtures that are not IPLDs. The communication cable segment 308 represents the presence of additional light fixtures. Communications along the DMX communications path is unidirectional, in accordance with one aspect of the DMX512 protocol.

FIG. 3 also shows a second central controller 380, illustrative a suitably programmed computer system having a monitor and a system cabinet. The central controller 380 communicates with the IPLDs 312, 314 and 316 over a digital communications path, which preferably is a moderate to high transmission rate digital communications path or network having enhanced performance relative to a standard DMX communications path. The enhanced performance communications path over which the central controller 380 communicates preferably is capable of simultaneously carrying multiple bi-directional channels of content, preferably continuous video content, in digital form. Such channels are referred to herein as content transfer channels. The enhanced performance communications path is also capable of simultaneously carrying commands that provide operating instructions to the IPLDs 312, 314 and 316, in addition to the content transfer channels. For full duplex operation, a hub or intelligent switch 330 is used, which individual bi-directional conductors 320, 322 and 324 being respectively run to the multiparameter light fixtures 312, 314 and 316. The use of such a hub or switch for full duplex communications is well known in the computer network arts, and is preferable because full duplex helps to minimize collisions of digital information traveling to and from the various light fixtures connected to the enhanced performance communications path. For half duplex communication, no such hub or switch need be used. Generally speaking, the enhanced performance communications path may be of any desired type, including, for example, such wired networks as token ring, FDDI ring, star, parallel bus, and serial bus, and such wireless networks as radio frequency ("RF") and infrared. Various protocols may be used depending on the type of network, including, for example, Ethernet, the CEBus (Consumer Electronics Bus) Standard EIA-600, Bluetooth, and the IEEE 802.11b networking standard. Other light fixtures in the lighting system 300, which are represented by the communication cable segment 308, may or may not be connected to the enhanced performance communications path.

The communications system of FIG. 3 illustratively operates as follows, for an illustrative situation in which the operator desires to have the IPLD 312 project one continuous video and the IPLDs 314 and 316 project a second continuous video. Illustratively, the first video is a movie that originates from, for example, a DVD player 340, while the second video is a pleasing dynamic multicolored graphics work generated by a computer graphics generator 350. The central controller 380 receives the respective video signals from the DVD 340 and graphics generator 350, and processes the video signals for transmission over the enhanced performance communications path to the IPLD devices 312, 314 and 316. The processing by the central controller 380 may involve compressing the video signals in a format such as MPEG (Motion Picture Experts Group), as is well known in the video compression art. A variety of compression techniques are well known and are suitable for reducing the bandwidth requirements of various image types, including video.

Content transfer channels each have an identification scheme or address. The identification scheme is defined as a way for the central processor of the IPLD to recognize a particular content transfer channel from a group of available content transfer channels available on the enhanced performance communications path. Examples of suitable address or identification schemes include a specific digital code such as a stream of bytes identifying the start of the channel, a timed based address when one particular content transfer channel starts sending video information, and the expected order of the content transfer channels. Any scheme by which an IPLD can select one particular content transfer channel from a plurality of content transfer channels is an identification scheme, and is herein referred to as an "address" for convenience. A particular IPLD is commanded over the enhanced performance communications path by commands sent from the central controller 380 to select, for example, content transfer channel 1 from several content transfer channels, and to decode the content transfer channel information and project the resultant image.

Each of the IPLDs 312, 314 and 316 has a unique device identifying address for use with the control channel of the enhanced performance communications path. This enables an operator to send operation commands to a specific IPLD from among many IPLDs. The command set used by the control channel for commanding the IPLDs may include but are not limited to the following commands: Lamp ON, Lamp OFF, X and Y (pan and tilt) coordinates, color change values, intensity values, request for service information, lens focus, and lens zoom. The command set may also include commands for the on board camera, such as zoom, focus, color balance, camera enable and iris. The control channel may have any suitable address or identification scheme, including, for example, a default address, a specific digital code such as a stream of bytes identifying the start of the channel, a timed based address when one particular channel starts sending information, an expected channel ordering, and so forth.

As implemented in FIG. 3, the communications protocol for the enhanced performance communications path uses an address for each light fixture to enable a light fixture to be discretely addressed from other light fixtures on the communications path, and also uses respective addresses for the several content transfer channels. The communications protocol for the enhanced performance communications path preferably has several hundred device addresses available to recognize IPLD devices, since large theatrical events use a large numbers of IPILDs. If a bidirectional communications path is used, the central controller 380 is also assigned an address. One method for controlling image projection lighting is the following. The operator inputs to the central controller 380 which IPLD is to be selected and what command the IPLD is to act upon. Any suitable input may be used, including, for example, a keyboard (not shown), interaction with a user interface (not shown) via a touch-sensitive screen or a mouse, or in any other desired manner. The address and command that was input by the operator is sent upon the control channel to the IPLDs on the enhanced performance communications path, and the IPLD with a matching address responds by acting upon the desired command. If the command is to access a content transfer channel for projection of an image, then the command contains the address of the desired content transfer channel. The addressed IPLD identifies the desired content transfer channel, and then decodes the content transfer channel to acquire and project the image.

Figure 4:
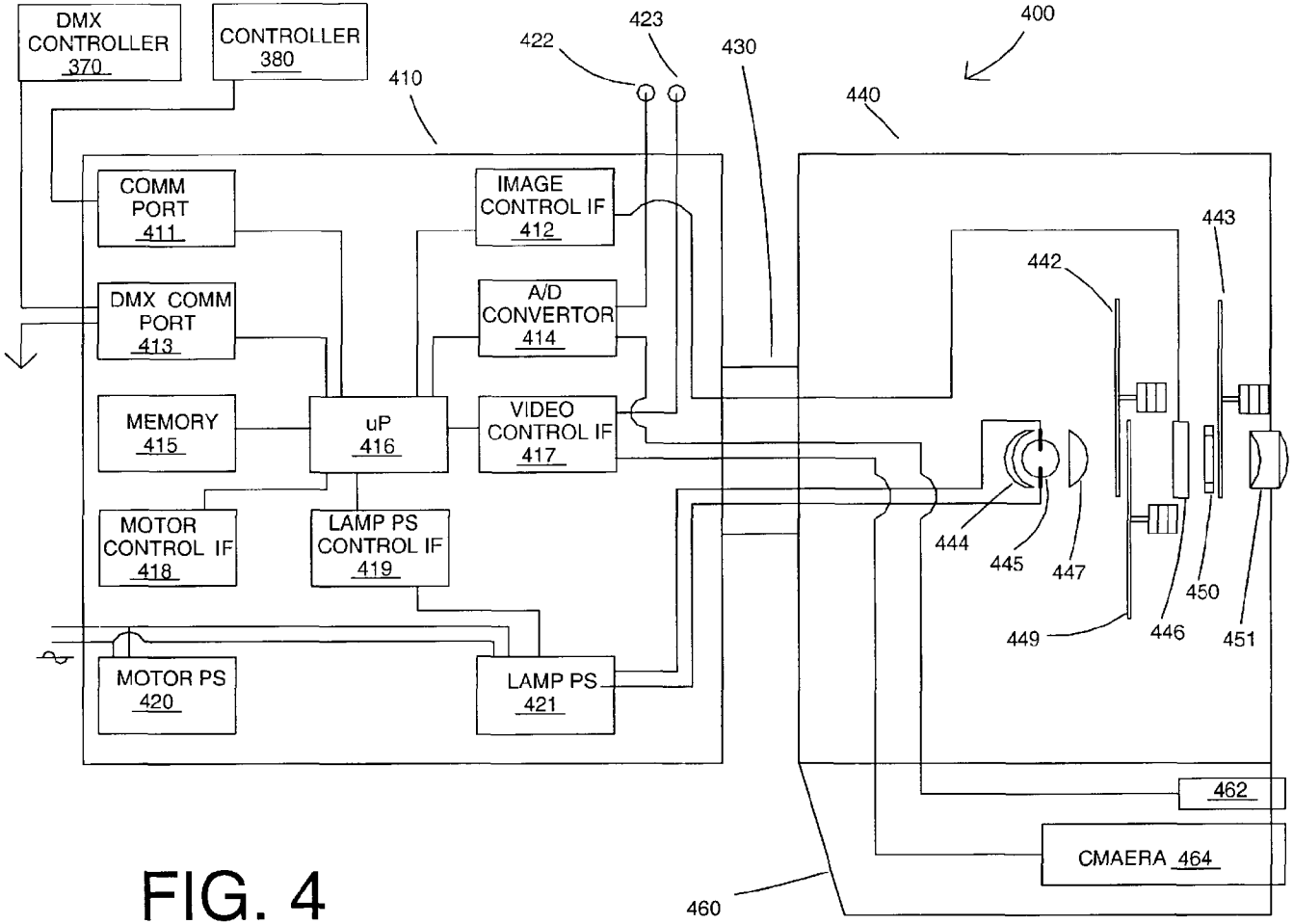
FIG. 4 is a schematic drawing of the architecture of an image projection lighting device.

The system architecture of an IPLD-type multiparameter light 400 having a camera 464 contained in a camera housing 460 that is rigidly attached to a lamp housing 440 is shown in FIG. 4, along with simplified portions of a communications system to which the IPLD 400 is connected. The camera housing 460 is rigidly attached to the lamp housing 440 so that as the lamp housing 440 is moved, the camera 464 and the light projected from the lamp housing 440 are directed towards the same place. As described in the context of FIG. 3, the DMX controller 370 is of a type well known in the art, and the central controller 380 illustratively is a computer system capable of communicating with IPLDs over an enhanced performance communications path. The DMX controller 370 may be omitted if desired.

The IPLD 400 has separate base and lamp housing sections with respective housings 410 and 440. The lamp housing section 440 is capable of pan and tilt relative to the base housing 410 by virtue of yoke (see yoke 120 in FIGS. 1 and 2). The base housing 410 contains an internal control system formed by, illustratively, a microprocessor 416 (various well known alternatives include microcontrollers, dedicated logic, and so forth) and a memory 415, a port 411 for the enhanced performance communications path, a port 413 for the DMX communications path, a motor control interface 418 for interfacing the microprocessor 416 to the motors (not shown) that move the lamp housing section 440 relative to the base housing 410, a lamp power supply control interface 419 for interfacing the microprocessor 416 to the lamp power supply 421, an image control interface 412 for interfacing the microprocessor 416 to a light valve 446, a video control interface 417 for interfacing the microprocessor 416 to the camera 464, and an analogue-to-digital ("A/D") converter 414 for interfacing the microprocessor 416 to a microphone 462. The microphone 462 illustratively is shown mounted in the camera housing 460, but may be mounted in the lamp housing 440 or in any other convenient place in the IPLD 400. The lamp housing 440 contains a reflector 444, a lamp 445, the light valve 446, a condensing lens 447, filter wheels 442, 449 and 443, an iris diaphragm 450 (motor omitted for clarity), and a focusing lens 451 (motor omitted for clarity). External connectors 422 and 423 (not shown in FIG. 1 or FIG. 2) are provided for external audio and video signals, respectively.

Various wires are run between the base housing 410 and the lamp housing 440 (some wires are omitted for clarity) through a wireway 430, which typically is a flexible conduit or pathway between the bearings used to attach the lamp housing 440 to the base housing 410 on pan and tilt lights. Various other well known components standard to multiparameter light fixtures, such as various thermal sensors and cooling system components, are omitted from FIG. 4 for clarity.

The communications port 413 has an input to receive the DMX transmissions from the DMX controller 370. The DMX input typically is looped through an output to pass communications received on the input to a neighboring light fixture (not shown) in the lighting system. The communications port 411 is an I/O port for handling communications between the central controller 380 and the IPLD 400 over the preferably bi-directional enhanced performance communications path, and may terminate the connection or act as a pass through depending on the networking technology used for the enhanced performance communications path. If desired, one may use a priority determining system such as, for example, the type described in my U.S. Pat. No. 6,331,756 entitled "Method and Apparatus for Digital Communications with Multiparameter Light Fixtures," which issued Dec. 18, 2001 and which hereby is incorporated herein by reference in its entirety.

If the central controller 380 transmits an address on the control channel over the enhanced performance communications path that is the same as the address of the IPLD 400, the match is recognized by the microprocessor 416 which then responds to an operational command that follows the address on the enhanced performance communications path. The memory 415 stores the operating system for the microprocessor 416, as well as various applications programs that are capable of producing or modifying images. One type of program for producing images is the graphics program, which generates artistic images using various algorithms. An example of a graphics program is the Gforce program, which is available from Andy O'Meara from his Website at the internet address http://www.55ware.com/index.html. The memory 415 is any type or combination of types of memory, including ROM and RAM, implemented in any desired memory technology, including magnetic, electronic or optical. If desired, the memory 415 may buffer incoming image data received from the communications port 411, from the camera 464, or from the external video input connector 422 to assist in producing a visually error free signal to the image control interface 412.

The microprocessor 416 acts on commands that are received from the communications system to control various parameters of the IPLD 400. For example, the microprocessor 416 controls the motors of the IPLD 400 through the motor control interface 418, controls power levels and duty cycle of the lamp 445 by controlling the lamp power supply 421 through the lamp power supply control interface 419, and to control the light valve 446 through the image control interface 412. Commands of this type may be received over the DMX communications path from the DMX controller 370 or over the enhanced performance communications path from the central controller 380. Other types of commands not conventionally sent over a DMX communications path may be sent over the enhanced performance communications path. For example, the microprocessor 416 may act on commands that are received over the enhanced performance communications path from the central controller 380 to control the camera 464 through the video control interface 417.

The microprocessor 416 also receives image data that is transmitted over one or more content transfer channels from the central controller 380 or from other IPLDs in the lighting system 400.

The microprocessor 416 also receives video signals from the video control interface 417. The video control interface 417 may include the ability to process the video signal in various ways, such as, for example, by compressing the video received from the camera 464, or signal compression may be performed in the microprocessor 416. The microprocessor 416 may use the camera video in various ways. One way is simply to use the camera video to control the light valve 446 through the image control interface 412. Another way is to transmit the camera image to any one or more other IPLDs in the lighting system or to the central controller 380 by transmitting the addresses of the selected IPLDs or the central controller 380 over the enhanced performance communications path on the control channel via the communications port 411, and transmitting the camera video over the enhanced performance communications path on one of the content transfer channels via the communications port 411. If the camera image is sent to the central controller 380, the central controller 380 may store the camera image for later use by any IPLD in the lighting system, or may manipulate the image in a manner to produce special effects or some pleasing alteration and then stored for later use or returned to the IPLD 400 or sent to any other IPLD in the lighting system. Any camera image received, stored, or manipulated by the central controller 380 may also be sent to a television network wireless transmitter 360 and transmitted over the airways or via satellite.

Transmitting a camera image from one IPLD (a "source") to another IPLD (a "recipient") in the lighting system may be performed by the operator in various ways, using the central controller 380. The operator may select the source or recipient first, depending on the desired effect. The operator selects the source IPLD by, for example, using the keyboard to type in the address of the source IPLD followed by the command to send its video image to the address of the particular content transfer channel. The operator selects the recipient IPLD by, for example, using the keyboard to type in the address of the recipient IPLD followed by the command to project any image data appearing on the particular content transfer channel that has been addressed. Alternatively or in addition to the projection command sent to the recipient IPLD, the recipient IPLD may be instructed to store any image data appearing on the particular content transfer channel. A variety of other addressing schemes, including addressing schemes well known in the art, are suitable for use in transmitting a camera image from one IPLD to another.

If the IPLD 400 is designated as a recipient IPLD for storage of images transmitted on one or more particular content transfer channels, the memory 415 would contain one or more sets of images received over one or more content transfer channels. These image data are stored and cataloged in the memory 415 of the IPLD 400 in any appropriate manner; for example, by date, time and address received from or by designated file names. The date, time and address image that identifies the image file may automatically become the identifier of the file when the record command is given from the central controller 380. It is also possible for the store command to contain a file name so that the operator can name the image file with the keyboard of the central controller 380 for later recall from the memory 415.

While the central controller 370 (FIG. 3) may use any desired protocol, preferably the central controller 370 uses the DMX protocol and a DMX communications path to maintain compatibility with conventional multiparameter lighting systems. The IPLDs 312, 314 and 316 are all on the DMX communications path. If the operator prefers to use the conventional DMX controller 370 to control image projection from the IPLDs, suitable control command sets are sent using the DMX protocol from the DMX controller 370 to operate the IPLDs in the desired manner. However, since the DMX protocol is not specified for the transmission of continuous video, any required application programs and image content would have to be available at the IPLD from local memory, in the absence of the enhanced performance communications path. However, with the enhanced performance communications path present, the various content transfer channels may be used to transfer image content among the central controller 380 and the various IPLDs in the lighting system for storage in local memory, so that the image content may later be recalled in response to a control command on the DMX communications path from the DMX controller 370 by first addressing the IPLD to respond to a selected address, and then commanding the IPLD to operate from its internal memory and project the image content. The DMX controller 370 also controls various other features of the IPLDs 312, 314 and 316, such as XY coordinates for pan and tilt, color, intensity, zoom, focus, video effects, camera white balance, camera enable, camera iris, and camera zoom and focus.

It will be appreciated that if all the light fixtures in the lighting system are interconnected by the communications path from the central controller 380, all of the functions of the DMX controller 370 as well as additional functions may be performed by the central controller 380. In this event, the DMX controller 370 and the DMX communications path may be omitted from the lighting system.

While image content may be transferred under operator control from the central controller 380, the DMX controller 370 may be used to control the transfer of image content between the IPLDs in the lighting system over the enhanced performance communications path in a manner similar to that described for the central controller 380, even in the absence of the central controller 380. The image data transferred between IPLDs can be projected immediately, stored locally, or both stored and projected, and may even be cataloged if desired. In this way the DMX controller 370 with the simpler protocol can still command a show of significant magnitude.

Figure 5:
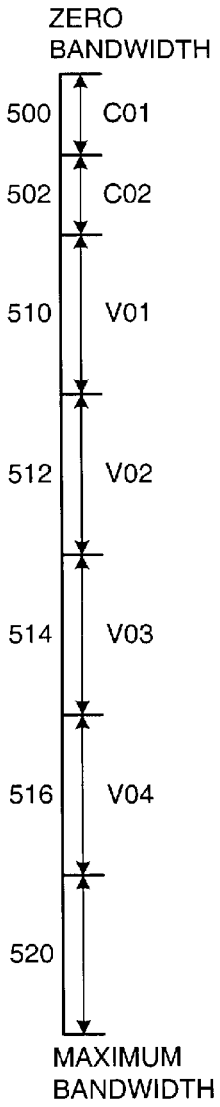
FIG. 5 is a bandwidth allocation diagram.

FIG. 5 shows one distribution of channel addresses for the enhanced performance communications path. Parts 500 and 502 of the bandwidth are taken up by two control channels, one of which is an auxiliary channel. The control channel 500 is used to command various operations of the IPLDs. This includes but is not limited to one or more of the following operations: supplying IPLD unique device addresses, supplying the addresses of the various content transfer channels for the IPIDs to use, lamp On, lamp Off, X and Y (pan and tilt) coordinates, color change values, intensity values, request for service information, lens focus, lens zoom, and on-board camera commands. The auxiliary channel 502 may contain control information for light fixtures that may not support the same protocols as used on the enhanced performance communications path. One example of how the auxiliary control channel 502 may be used is in a lighting system having gateway-capable light fixtures, such as described in U.S. Pat. No. 6,331,756, which hereby is fully incorporated herein by reference thereto. The central controller 380 may originate DMX command sets for the DMX communications path, but send the commands over the auxiliary channel 502 in a form suitable for the enhanced performance communications path. As further described in the aforementioned U.S. Pat. No. 6,331,756, a gateway-capable light fixture, which may also be an IPLD, receives the control information sent on the auxiliary channel on a communications port, decodes and converts it to a DMX protocol signal, and transmits the DMX protocol signal from a DMX communications port. In this way, the IPLD may act as a gateway-capable lighting fixture. This eliminates the need to run additional communication cables to the location where the other type of lighting fixtures and devices are located if they are in the vicinity of a IPLD acting as a gateway. The auxiliary channel is capable of transmitting several DMX universes, wherein a DMX universe is a group of 512 channels per universe. Each universe can be identified by an identifier when decoded at the IPLD acting as a gateway.

While FIG. 5 (and FIG. 6) show only one auxiliary channel 502 in addition to the control channel 500, one or more additional auxiliary channels may be provided with their own identifying addresses, if desired.

An auxiliary channel may carry additionally or separately other types of information, including audio information and low quality image information. Each IPLD may be equipped with a transducer device such as described in my U.S. Pat. No. 6,249,091, which issued Jun. 19, 2001, and hereby is incorporated herein by reference in its entirety. The transducer may be a microphone such as the microphone 462 (FIG. 3), and may send a signal representation of sound waves to an analog-to-digital converter 414 (FIG. 3). The digital audio signal from the converter 414 is sent to the microprocessor 416, where it can be further processed for various purposes. One such purpose to for the microprocessor 416 to manipulate the digital audio data for use in altering an image at the light valve 446. As explained more fully in the aforementioned U.S. Pat. No. 6,249,091, various other parameters can be modified by command signals contained in an auxiliary channel of the enhanced performance communications path of a communications system. Another such purpose is to transmit the digital audio data from the microprocessor 416 through the communications port 411 (FIG. 4) to the central controller 380, where it may be stored or used in various ways. Since the IPLDs are likely to me mounted in various locations around a stage, there are uses for audio signals in various locations close to performers, the audience, or specific instruments. For example, the digital audio data received at the central controller 380 from the IPLD over the enhanced performance communications path of the communications system is from a specific location on the stage. The central controller 380 then processes the audio content to provide or modify operating commands sent on the control channel of the enhanced performance communications path to specific IPLDs based on the audio content. In this way, various addressed IPLDs commanded by the central controller 380 may have their parameters modified based upon the audio received from a specific IPLD. In addition, an external audio source (not shown) may be plugged into the external audio connector 422 (FIG. 4) so that various parameters including an image at the image gate may be modified in accordance therewith. The external audio input works in the same manner as the transducer output. The external audio input may be used simultaneously with the transducer or an external switch (not shown) may be used to switch between the transducer 462 and the external input [423] *422*. It is also possible to electronically switch between the transducer 462 and the external audio input [423] *422* with an electronic switch as known in the art that is controlled by the microprocessor 416. The transducer 462 and the external audio input [423] *422* may be stereo or multichannel as known in the art. The external audio input may alternatively be a digital audio input. The input connector may be mounted to the housing of the IPLD.

The IPLD may also have at least one external video input such as the video input 423 (FIG. 4) mounted to the outside of the base housing 410 of the IPLD 400, or in any other convenient place on the IPLD. The video input 423 is fed into the video control interface 417, which that converts the external video signal to a digital video signal as required by the microprocessor 416. Alternatively, the external video input may be digital, RGB, or any other type of video signal known in the art. The microprocessor 416 selects which of the inputs to the video control interface 417, the camera 464 or the external video input 423, is to be processed, or may select both inputs for processing as a combined image. The external video or combined video may be processed for the purposes described for the video from the camera 464 alone, namely, to be sent to the image control interface 412 for manipulation of the light valve 446 to produce a desired projected image, or to be sent to the central controller 380 or to other IPLDs in the lighting system over a content transfer channel on the enhanced performance communications path via the port 411. If sent to the central controller 380, the central controller 380 may store the video image, or may further process the video image for subsequent use or for immediate transmission back to the originating IPLD or to other IPLDs in the lighting system.

The microprocessor 416 may be programmed in various ways to process images, whether received from the camera 464, from the external video input 423, any image content (video or graphics) received over any content transfer channel, and any image content (video or graphics) stored in the memory 415. The microprocessor 416 in the IPLD 400 may be commanded by the central controller 380 to act upon any of the sources of content described above. The IPLD 400 may act upon the various content in a variety of different ways, as by transferring content to another IPLD over the communications system, or by projecting an image using the light valve 446 on a stage or other projection surface. Modifications include but are not limited to rotation of the image, digital zoom, keystone correction, color modification, fading between one video content source such as one content transfer channel to another, and various other special effects.

FIG. 5 also shows four content transfer channels 510, 512, 514 and 516, in addition to the control channel 500 and the auxiliary channel 502. Illustratively, each of the content transfer channels 510, 512, 514 and 516 has the same bandwidth. The enhanced performance communications path also is allocated unused bandwidth 520, which provides a buffer so that the enhanced performance communications path is allowed to degrade slightly without causing loss of data on the control and content transfer channels. Degrading of bandwidth can happen from various causes, including error checking and collisions as will as long cable distances.

Figure 6:
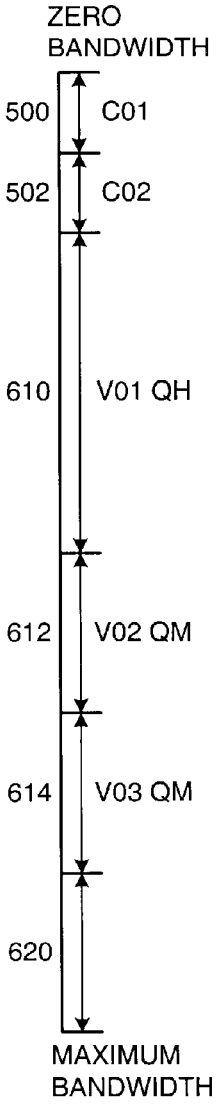
FIG. 6 is a bandwidth allocation diagram.

FIG. 6 shows another allocation of bandwidth to the enhanced performance communications path. The control channel 500 and the auxiliary channel 502 are allocated as in the allocation of FIG. 5. One of the content transfer channels, channel 610, is allocated greater bandwidth than the other content transfer channels 612 and 614, which provides a high quality content transfer channel 610 in addition to the normal quality content transfer channels 612 and 614. High quality often requires the use of increased bandwidth. More than two quality levels may be provided if desired; for example, the auxiliary channel 502 may be used as a low quality image channel. The address of the content transfer channel may be followed by a quality identifier. For example, in FIG. 6 the high quality content transfer channel 610 has the address V01 and the quality identifier QH (quality high) so that a receiving device such as the central controller 380 or another IPLD can optimize the receiving processing of the content transfer channel. The lower quality (less bandwidth) content transfer channels 612 and 614 respectively have the addresses V02 and V03 and the quality identifier QM (quality medium) following their addresses. If the auxiliary channel 502 is used for video transfer, its address might have the quality identifier QL (quality low). If no video quality identifier is sent the content transfer channel may operate at a default quality such as QM.

As can be seen by comparing FIG. 5 and FIG. 6, higher quality video transferring requires more bandwidth and as such may reduce the number of content transfer channels available to the enhanced performance communications path. However, at certain times it is acceptable to sacrifice the number of available content transfer channels if transferring a high quality image has the highest priority.

The level of quality established for the various content transfer channels may be dynamically set by the operator. The operator decides which of the central controller 380 and the other IPLDs in the lighting system are to receive the image content from the source IPLD, and also decides on the importance of a particular image content that is intended to be transmitted. Using the central controller 380, the operator enters using the keyboard or any other suitable input technique the source IPLD address, followed by the address of the content transfer channel to be used for sending the particular image content, followed by a quality identifier to indicate the level of quality. Using the central controller 380, the operator enters using the keyboard or any other suitable input technique the recipient IPLD (or central controller) address or addresses, followed by the address of the content transfer channel to be used for sending the particular image content to the recipient, followed by a quality identifier to indicate the level of quality.

Preferably, a quality identifier is furnished to both the source and recipient so that the source may ready the data by preparing the appropriate level of compression, and the recipient may optimize the receiving process. The part of the communications system under control of the central controller 380 preferably is designed so that an operator of the central controller 380 can command all the IPLDs, including what is being sent on a content transfer channel, what IPLD is projecting from what content transfer channel, and what the quality of the video is on the content transfer channel. The quality identifier can happen as a separate identifier that is sent when the commands are given for the IPLD to select the designated content transfer channel, or it could automatically happen by the IPLD just recognizing the bandwidth or other attributes such as a data stream of the content transfer channel. Preferably, the IPLD receives specific commands that identify the quality of the channel it is about to act upon. The order in which the commands are given can be varied. For instance, the operator could address an IPLD to receive a particular content transfer channel at a particular quality level, and to act by projecting that image content with no image content yet being transferred on the particular content transfer channel. Later the operator could supply from the control system a continuous video signal over that particular content transfer channel, in which event the IPLD would respond as soon as the continuous video signal is detected on the particular content transfer channel.

The description of the invention and its applications as set forth herein is illustrative and is not intended to limit the scope of the invention as set forth in the following claims. Variations and modifications of the embodiments disclosed herein are possible, and practical alternatives to and equivalents of the various elements of the embodiments are known to those of ordinary skill in the art. These and other variations and modifications of the embodiments disclosed herein may be made without departing from the scope and spirit of the invention.

What is claimed is:

[1. A lighting system comprising:

a central controller;

a digital communications path comprising a plurality of content transfer channels having respective unique content transfer channel addresses and being individually selectable in accordance with the content transfer channel addresses thereof; and a plurality of image projection lighting devices having respective unique device addresses and being interconnected by the digital communications path for communicating content on a selected one or more of the content transfer channels in response to commands from the central controller.]

[2. The lighting system of claim 1 wherein:

the digital communications path is bi-directional and further comprises a control channel; and the central controller is interconnected with the image projection lighting devices by the digital communications path for communicating device addresses and content transfer channel addresses on the control channel.]

[3. The lighting system of claim 2 wherein the digital communications path further comprises an auxiliary channel accessible to the central controller and to the image projection lighting devices for communicating commands and content in digital form.]

[4. The lighting system of claim 1 further comprising:

a DMX controller; and a DMX communications path;

wherein the image projection lighting devices are additionally interconnected by the DMX communications path for communicating device addresses and content transfer channel addresses thereon.]

[5. The lighting system of claim 4 wherein at least one of the image projection lighting devices is a gateway-capable light fixture.]

[6. A lighting system comprising:

a first digital communications path compliant with a DMX protocol;

a second digital communications path having a bandwidth sufficient for transferring content in digital form;

a plurality of light fixtures interconnected by the first digital communications path, the light fixtures including a plurality of image projection lighting devices having respective unique device addresses and being interconnected by both the first and second digital communications paths; and a DMX controller interconnected with the light fixtures by the first digital communications path;

wherein the second digital communications path is a bi-directional path comprising a plurality of addressable content transfer channels individually selectable by the DMX controller in accordance with the addresses thereof.]

[7. The lighting system of claim 6 wherein the second digital communications path further comprises an addressable control channel, the lighting system further comprising an additional central controller interconnected with the image projection lighting devices by the second digital communications path, wherein the content transfer channels and the control channel are individually selectable by the additional central controller in accordance with the addresses thereof.]

[8. A multiparameter light comprising:

an internal control system;

a light valve;

an image control interface coupling the light valve to the internal control system;

a communications port coupled to the internal control system;

wherein the internal control system comprises:

a component for recognizing a unique device address received at the communications port on a control channel; and a component for selectively accessing a plurality of content transfer channels having respective unique content transfer channel addresses to communicate content in digital form thereon in response to receipt of the unique device address and at least one of the content transfer channel addresses at the communications port on the control channel.]

[9. The multiparameter light of claim 8 further comprising:

a camera; and a video control interface coupling the camera to the internal control system.]

[10. The multiparameter light of claim 8 wherein the component for selectively accessing a plurality of content transfer channels comprises:

a component for receiving continuous video signals; and a component for transmitting continuous video signals.]

[11. A method of controlling a lighting system comprising a digital communications path with a bandwidth sufficient for communicating a plurality of content signals in digital form on respective transfer channels having respective unique channel addresses, and a plurality of image projection lighting devices interconnected by the digital communications path and having respective unique device addresses, the method comprising:

selecting a first one of the image projection lighting devices by the unique device address thereof;

instructing the first image projection lighting device to communicate a first content signal on a first one of the transfer channels of the digital communications path by the unique channel address thereof;

selecting a second one of the image projection lighting devices by the unique device address thereof; and instructing the second image projection lighting device to communicate a second content signal on a second one of the transfer channels of the digital communications path by the unique channel address thereof.]

[12. The method of claim 11 further comprising:

selecting a third one of the image projection lighting devices by the unique device address thereof;

instructing the third image projection lighting device to communicate the first content signal on the first transfer channel by the unique channel address thereof;

selecting a fourth one of the image projection lighting devices by the unique device address thereof; and instructing the fourth image projection lighting device to communicate the second content signal on the second transfer channel by the unique channel address thereof.]

[13. The method of claim 12 further comprising:

transmitting the first content signal to the digital communications path on the first transfer channel with one of the first and third image projection lighting devices;

receiving the first content signal from the digital communications path on the first transfer channel with the other one of the first and third image projection lighting devices;

transmitting the second content signal to the digital communications path on the second channel with one of the second and fourth image projection lighting devices; and receiving the second content signal from the digital communications path on the second channel with the other one of the second and fourth image projection lighting devices.]

[14. The method of claim 11 wherein the lighting system further comprises a central controller interconnected with the image projection lighting devices by the digital communications path, the method further comprising:

communicating, with the central controller, the first content signal on the first transfer channel by the unique channel address thereof; and communicating, with the central controller, the second content signal on the second transfer channel by the unique channel address thereof.]

[15. The method of claim 11 wherein the lighting system further comprises a central controller interconnected with the image projection lighting devices by the digital communications path, the method further comprising:

transmitting the first content signal to the digital communications path on the first transfer channel with one of the first image projection lighting device and the central controller;

receiving the first content signal from the digital communications path on the first transfer channel with the other one of the first image projection lighting device and the central controller;

transmitting the second content signal to the digital communications path on the second channel with one of the second image projection lighting device and the central controller; and receiving the second content signal from the digital communications path on the second channel with the other one of the second image projection lighting device and the central controller.]

[16. The method of claim 11 wherein at least one of the first and second content signals is an audio signal.]

[17. The method of claim 11 wherein at least one of the first and second content signals is a video signal.]

[18. The method of claim 11 further comprising:

acquiring the first content signal from a camera disposed with the first image projection lighting device, the first content signal comprising a video content signal; and transmitting the first content signal to the digital communications path on the first transfer channel with the first image projection lighting device.]

[19. The method of claim 11 further comprising:

acquiring the first content signal from an external video input disposed with the first image projection lighting device, the first content signal comprising a video content signal; and transmitting the first content signal to the digital communications path on the first transfer channel with the first image projection lighting device.]

[20. The method of claim 11 further comprising:

acquiring the first content signal from a memory of the first image projection lighting device, the first content signal comprising a video content signal; and transmitting the first content signal to the digital communications path on the first transfer channel with the first image projection lighting device.]

[21. The method of claim 11 further comprising:

acquiring the first content signal from a microphone disposed with the first image projection lighting device, the first content signal comprising an audio content signal; and transmitting the first content signal to the digital communications path on the first transfer channel with the first image projection lighting device.]

[22. The method of claim 11 further comprising:

acquiring the first content signal from an external audio input disposed with the first image projection lighting device, the first content signal comprising an audio content signal; and transmitting the first content signal to the digital communications path on the first transfer channel with the first image projection lighting device.]

[23. The method of claim 11 wherein:

the lighting system further comprises a central controller interconnected with the image projection lighting devices by the digital communications path;

the bandwidth of the digital communications path is also sufficient for communicating a command signal on a control channel, the control channel having a unique channel address; and the first image projection lighting device selecting step comprises sending a command signal from the central controller to the digital communications path on the control channel by the unique channel address thereof, the command signal comprising the unique device address for the first image projection lighting device and the unique channel address for the first transfer channel.]

[24. The method of claim 23 wherein the bandwidth of the digital communications path is also sufficient for communicating a quality identifier signal on the command channel, the command signal further comprising the quality identifier signal.]

[25. The method of claim 11 wherein:

the lighting system further comprises a DMX controller interconnected with the image projection lighting devices by a DMX communications path; and the first image projection lighting device selecting step comprises sending a DMX command signal from the DMX controller to the DMX communications path.]

[26. A lighting system comprising:

a central controller;

an image projection lighting device comprising a housing, a light valve contained within the housing, and at least one communications connector mounted to the housing; and a digital communications path comprising a plurality of content transfer channels having respective unique content transfer channel addresses, the digital communications path being coupled to the central controller and further being coupled to the image projection lighting device via the communications connector.]

[27. The lighting system of claim 26 wherein the image projection lighting device further comprises at least one external video input mounted to the housing.]

[28. The lighting system of claim 27 wherein the external video input is analog.]

[29. The lighting system of claim 27 wherein the external video input is digital.]

[30. A lighting system comprising:

a central controller;

an image projection lighting device comprising a housing, a light valve contained within the housing, an external video input mounted to the housing, an external audio input mounted to the housing, and at least one communications connector mounted to the housing; and a digital communications path comprising a plurality of content transfer channels having respective unique content transfer channel addresses, the digital communications path being coupled to the central controller and further being coupled to the image projection lighting device via the communications connector.]

[31. The lighting system of claim 30 wherein the external audio input is analog.]

[32. The lighting system of claim 30 wherein the external audio input is digital.]

[33. A method of controlling a lighting system comprising a digital communications path and a plurality of image projection lighting devices interconnected by the digital communications path, the method comprising:

instructing a first one of the image projection lighting devices by a first device address to transmit an image-containing signal to the digital communications path, the first device address being unique to the first image projection lighting device; and instructing a second one of the image projection lighting devices by a second device address to receive an image-containing signal from the digital communications path, the second device address being unique to the second image projection lighting device;

wherein transfer of an image from the first image projection lighting device to the second image projection lighting device occurs when the first image projection lighting device is transmitting and the second image projection lighting device is receiving, regardless of when the first image projection lighting device instructing step occurs relative to the second image projection lighting device instructing step.]

[34. A method of controlling a lighting system comprising a digital communications path and a plurality of image projection lighting devices interconnected by the digital communications path, the method comprising:

transmitting an image-containing signal from a first one of the image projection lighting devices to the digital communications path, the image-containing signal containing an image from a source disposed with the first image projection lighting device; and receiving the image-containing signal at a second one of the image projection lighting devices from the digital communications path.]

[35. The method of claim 34 wherein the source is a memory of the first image projection lighting device, further comprising reading the image from the memory for transmission to the digital communications path.]

[36. The method of claim 34 wherein the source is a camera disposed with the first image projection lighting device, further comprising acquiring the image from the camera for transmission to the digital communications path.]

[37. A lighting system comprising:

a digital communications path having a control channel;

a plurality of image projection lighting devices having respective unique device addresses and being interconnected by the digital communications path; and a central controller interconnected with the image projection lighting devices by the digital communications path;

wherein at least one of the image projection lighting devices comprises a camera; and wherein the image projection lighting devices are individually selectable by their respective device addresses to receive a camera control signal from the control channel of the digital communications path.]

[38. The lighting system of claim 37 wherein the camera control signal is a camera enable signal, a color balance signal, an iris signal, a focus signal, or a zoom signal.]

[39. A method of controlling a lighting system comprising a digital communications path, a central controller, and a plurality of image projection lighting devices, the central controller and the image projection lighting devices being interconnected by the digital communications path, the method comprising:

instructing a first one of the image projection lighting devices by a first device address to transmit an image-containing signal to the digital communications path, the first device address being unique to the first image projection lighting device; and enabling the central controller to receive an image-containing signal from the digital communications path;

wherein transfer of an image from the first image projection lighting device to the central controller occurs when the first image projection lighting device is transmitting and the central controller is receiving, regardless of when the first image projection lighting device instructing step occurs relative to the central controller instructing step.]

[40. The method of claim 39 further comprising reading the image from a memory of the first image projection lighting device for transmission to the digital communications path.]

[41. The method of claim 39 further comprising acquiring the image from a camera disposed with the first image projection lighting device, for transmission to the digital communications path.]

[42. The method of claim 39 wherein the enabling step comprises instructing the central controller by a second device address to receive an image-containing signal from the digital communications path, the second device address being unique to the central controller.]

[43. A method of controlling a lighting system comprising a digital communications path, a central controller, and a plurality of image projection lighting devices, the central controller and the image projection lighting devices being interconnected by the digital communications path, the method comprising:

instructing a first one of the image projection lighting devices by a first device address to receive a first image-containing signal from the digital communications path, the first device address being unique to the first image projection lighting device;

instructing a second one of the image projection lighting devices by a second device address to receive a second image-containing signal from the digital communications path, the second device address being unique to the second image projection lighting device;

transmitting the first image-containing signal to the digital communications path from the central controller; and transmitting the second image-containing signal to the digital communications path from the central controller, wherein transfer of a first image is enabled after both the first image projection lighting device instructing step and the first image-containing signal transmitting step occur, regardless of the order thereof; and wherein transfer of a second image is enabled after both the second image projection lighting device instructing step and the second image-containing signal transmitting step occur, regardless of the order thereof.]

[44. A method of controlling a lighting system comprising a digital communications path, a central controller, and a plurality of image projection lighting devices, the central controller and the image projection lighting devices being interconnected by the digital communications path, the method comprising:

transmitting a first image-containing signal to the digital communications path from the central controller;

receiving the first image-containing signal from the digital communications path at a first one of the image projection lighting devices based on a first device address, the first device address being unique to the first image projection lighting device;

transmitting a second image-containing signal to the digital communications path from the central controller; and receiving the second image-containing signal from the digital communications path at a second one of the image projection lighting devices based on a second device address, the second device address being unique to the second image projection lighting device;

wherein transfer of a first image occurs after both the first image-containing signal transmitting step and the first image-containing signal receiving step occur, regardless of the order thereof; and wherein transfer of a second image occurs after both the second image-containing signal transmitting step and the second image-containing receiving step occur, regardless of the order thereof.]

[45. A method of controlling a lighting system comprising a digital communications path, a central controller, and a plurality of image projection lighting devices, the central controller and the image projection lighting devices being interconnected by the digital communications path, the method comprising:

transmitting an instruction from the central controller to a first one of the image projection lighting devices to receive and store an image-containing signal from the digital communications path, the instruction including a first device address unique to the first image projection lighting device;

receiving the image-containing signal from the digital communications path with the first image projection lighting device; and storing an image from the image-containing signal received in the receiving step in a memory of the first image projection lighting device.]

[46. The method of claim 45, further comprising transmitting the image-containing signal from the central controller to the digital communications path.]

[47. The method of claim 45, further comprising transmitting the image-containing signal from a memory of a second one of the image projection lighting devices.]

[48. The method of claim 45, further comprising transmitting the image-containing signal from a camera disposed with a second one of the image projection lighting devices.]

[49. A method of controlling a lighting system comprising a digital communications path, a central controller, and a plurality of image projection lighting devices, the central controller and the image projection lighting devices being interconnected by the digital communication path, the method comprising:

receiving an image-containing signal from the digital communications path with a first one of the image projection lighting devices;

transmitting an instruction from the central controller to the first image projection lighting device, by a first device address unique to the first image projection lighting device, to act upon the image-containing signal from the receiving step; and acting upon the image-containing signal from the receiving step in accordance with the instruction from the transmitting step under control of a microprocessor in the first image projection lighting device.]

[50. The method of claim 49, wherein the acting upon step further comprises transferring an image in the image-containing signal to a second one of the image projection lighting devices.]

[51. The method of claim 49, wherein the acting upon step further comprises projecting an image in the image-containing signal from the first image projection lighting device.]

[52. The method of claim 49, wherein the acting upon step further comprises modifying an image in the image-containing signal.]

[53. The method of claim 49:

further comprising receiving an additional image-containing signal from the digital communications path with the first image projection lighting devices;

wherein the acting upon step further comprises fading from an image in the image-containing signal to another image in the additional image-containing signal.]

[54. A method of controlling a lighting system comprising a digital communications path, a central controller, and a plurality of image projection lighting devices, the central controller and the image projection lighting devices being interconnected by the digital communications path, the method comprising:

selecting a channel bandwidth from among a plurality of channel bandwidths to establish a level of image quality;

transmitting an instruction from the central controller to a first one of the image projection lighting devices by a first device address to receive an image-containing signal at the selected bandwidth from the digital communications path, the first device address being unique to the first image projection lighting device; and transmitting the image-containing signal to the digital communications path at no greater than the selected bandwidth.]

*55. An apparatus comprising*

*a first image projection device comprising:*

*a first housing comprising:*

*a first light source;*

*a first light valve disposed along a first light path from the first light source;*

*a first lens device disposed along the first light path, the first lens device including a first focusing device;*

*a first memory for storing data;*

*a first digital communications port for receiving bidirectional network communications;*

*wherein the bidirectional network communications comprise a plurality of address signals, a plurality of command signals, and a plurality of video signals for a plurality of projection devices wherein the plurality of projection devices includes the first image projection device;*

*wherein the plurality of address signals includes a first address signal unique to the first image projection device;*

*wherein the housing further comprises a first control device coupled to the first digital communications port and to the first memory;*

*wherein the first control device is programmed to respond to the first address signal;*

*wherein the first control device is programmed to respond to a first command signal of the plurality of command signals;*

*wherein after the first control device responds to the first command signal, the first control device is programmed to cause the first image projection device to project a first video derived from a first video signal of the plurality of video signals;*

*the apparatus further comprising a second image projection device of the plurality of projection devices, said second image projection device comprising:*

*a second housing comprising:*

*a second light source;*

*a second light valve disposed along a second light path from the second light source;*

*a second lens device disposed along the second light path, the second lens device including a second focusing device;*

*a second memory for storing data;*

*a second digital communications port for receiving the same bidirectional network communications as the first image projection device,*

*wherein the plurality of address signals of the bidirectional network communications include a second address signal unique to the second image projection device;*

*the second housing further comprising a second control device coupled to the second digital communications port and to the second memory,*

*wherein the second control device is programmed to respond to the second address signal;*

*wherein the second control device is programmed to respond to a second command signal of the plurality of command signals;*

*wherein after the second control device responds to the second command signal the second control system is programmed to cause the second image projection device to project a second video derived from a second video signal of the plurality of video signals; and*

*wherein the first video signal and the second video signal are different.*

*56. The apparatus of claim 55 wherein*

*the first control device is programmed to respond to a third command signal of the plurality of command signals received at the first digital communications port by storing a first set of data in the first memory.*

*57. The apparatus of claim 56 wherein*

*the first set of data is video image data.*

*58. The apparatus of claim 56 wherein*

*the first set of data is video data.*

*59. The apparatus of claim 56 wherein*

*the first set of data is camera data.*

*60. The apparatus of claim 55 wherein*

*the first control device is programmed to respond to a third command signal of the plurality of command signals received at the first digital communications port by varying focus of the first lens device by using the first focusing device.*

*61. The apparatus of claim 55 wherein*

*the first control device is programmed to respond to a third command signal of the plurality of command signals received at the first digital communications port by varying zoom of the first lens device.*

*62. The apparatus of claim 55 wherein*

*the first control device is programmed to respond to a third command signal of the plurality of command signals received at the first digital communications port by modifying an image projected from the first image projection device.*

*63. The apparatus of claim 58 wherein*

*the video data is cataloged by date.*

* * * * *